June 14, 1927.
C. P. MULLEN
EAVES TROUGH SUPPORT
Filed April 10, 1926
2 Sheets-Sheet 1
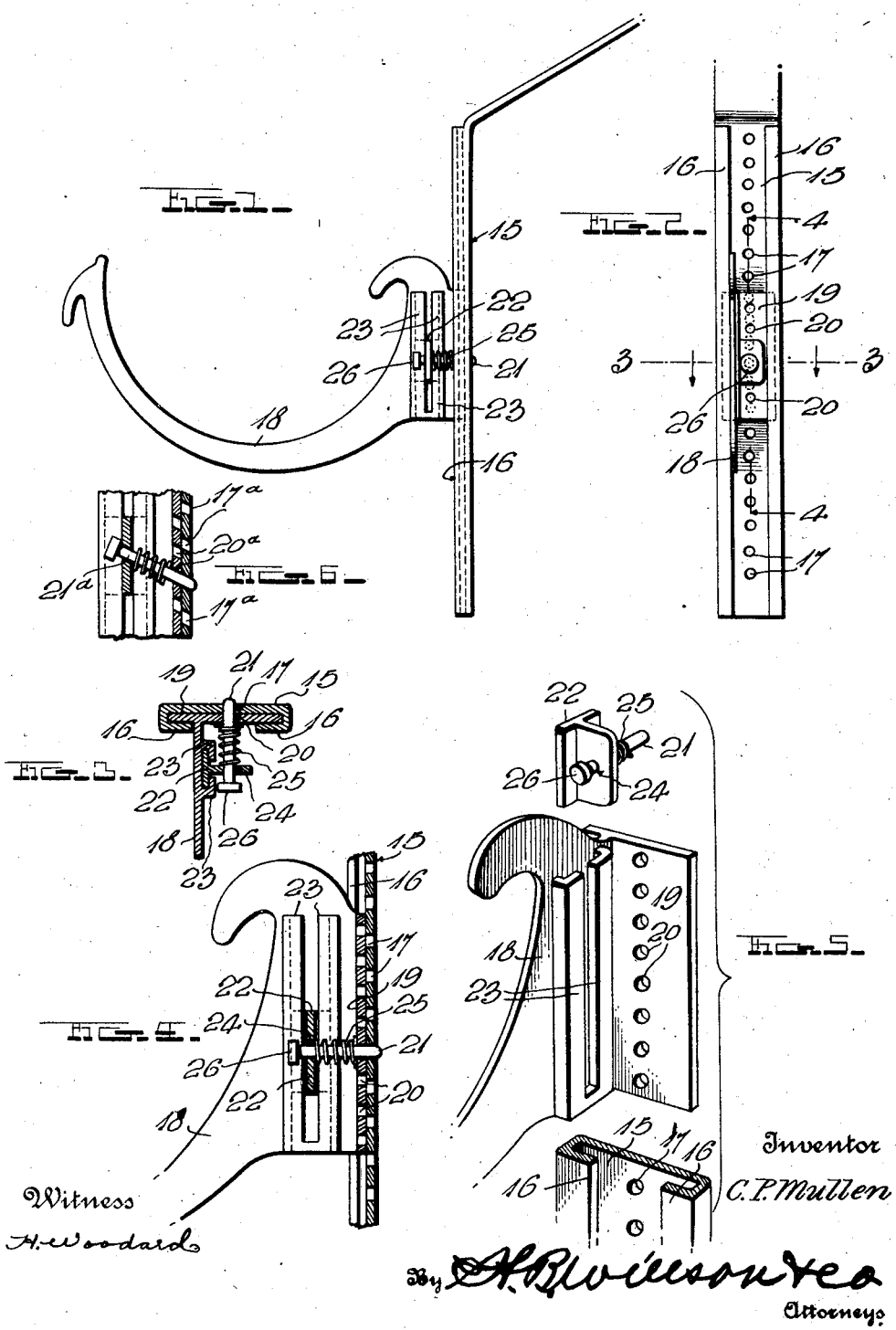

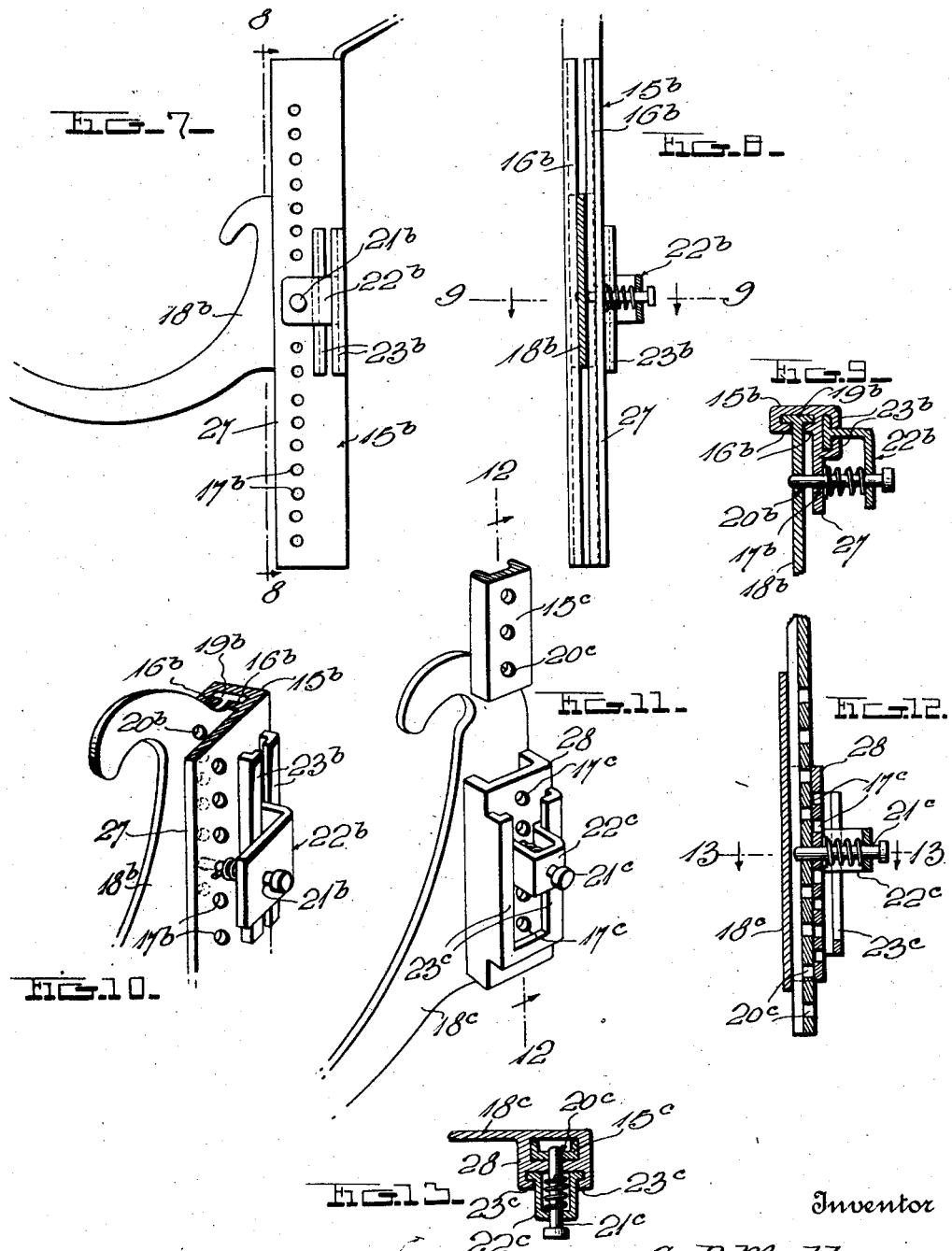

Patented June 14, 1927.

1,632,036

UNITED STATES PATENT OFFICE.

CHARLES P. MULLEN, OF CONSHOHOCKEN, PENNSYLVANIA.

EAVES-TROUGH SUPPORT.

Application filed April 10, 1926. Serial No. 101,166.

The invention relates to improvements in devices for supporting eave troughs, and it has reference more particularly to devices of this character formed of stationary upper sections secured to the roof, vertically adjustable lower sections connected with the trough, and means connecting the upper and lower sections, said sections having differently spaced openings which permit vertical adjustment of the lower sections to any desired extent.

It is the principal object of the present invention to provide a new and improved form of eave trough support, in which the upper and lower relatively slidable sections are provided with differently spaced openings, and in which the lower section carries a slidably mounted pin for vertical adjustment into alinement with the alined openings of the upper and lower sections so that it may be projected through these openings to secure the sections of the support in adjusted position.

It is another object of the invention to provide simple, inexpensive, yet efficient means for slidably supporting the pin so that it may be readily adjusted to any desired position.

With the foregoing in view, the invention resides in the novel subject matter hereinafter described and claimed, the description being supplemented by the accompanying drawing.

Fig. 1 is a side elevation showing one form of the support.

Fig. 2 is a front elevation thereof.

Figs. 3 and 4 are sectional views as indicated by lines 3—3 and 4—4 of Fig. 2.

Fig. 5 is a disassembled perspective view.

Fig. 6 is a sectional view similar to Fig. 4 but showing a slight variation in construction.

Fig. 7 is a side elevation showing a different form of the invention.

Fig. 8 is a front elevation partly in section on line 8—8 of Fig. 7.

Fig. 9 is a horizontal sectional view on line 9—9 of Fig. 8.

Fig. 10 is a fragmentary sectional perspective view of the form of construction shown in Figs. 7, 8 and 9.

Fig. 11 is a fragmentary sectional perspective showing a still further form of construction.

Fig. 12 is a vertical section on line 12—12 of Fig. 11.

Fig. 13 is a horizontal section on line 13—13 of Fig. 12.

In the form of construction shown in Figs. 1 to 5, the numeral 15 designates a channel-shaped vertically disposed metal bar whose upper end is suitably constructed to permit attachment to the edge of a roof, in any desired manner. This bar is provided with parallel flanges 16, portions of which project forwardly from the body portion of said bar, while other portions of said flanges are parallel with and forwardly spaced from said body portion. This body portion of the bar 15 is formed with vertically spaced openings 17 for a purpose to appear.

An eaves trough-engaging member 18, commonly known as a "circle" is provided at its inner end with a plate 19 slidably received between the body portion of the bar 15 and the forwardly spaced portions of the flanges 16, and said plate is formed with vertically spaced openings 20, any of which may be alined with any of the openings 17, according to the extent which the member 18 is vertically adjusted. A pin 21 is provided to pass through these alined openings, so as to lock the upper and lower sections 15—18 of the trough-supporting means, in relatively adjusted position. A slide 22 is provided to carry this pin, said slide being preferably of T-shape in top plan view and having its head portion slidably engaged with angular flanges 23 formed vertically on one side of the member 18, at the inner end of the latter. The portion of the slide projecting from the head thereof, is formed with an opening 24 through which the pin 21 passes slidably, so that after adjusting the member 18 upon the fixed member 15, until two of the openings 17—20 have been alined, the slide 22 and pin 21 may be vertically adjusted so that said pin may be forced through the alined openings. This pin is preferably provided with a spring 25 for projecting it and its front end is preferably formed with a head 26 by means of which it may be forwardly pulled against the action of said spring.

In Fig. 6, it may be considered that the construction is identical with that so far described, with the exception that the pin 21ª is rearwardly declined, and the openings 17ª and 20ª are similarly declined. When this positioning is used, there is less chance of the pin pulling out of the opening of the member 15, after adjustment of the two sections of the supporting means.

In the form of construction shown in Figs. 7 to 10 inclusive, 15ᵇ designates a stationary vertical bar having angular flanges 16ᵇ which guide a plate or shoe 19ᵇ on the trough-supporting member 18ᵇ. The bar 15ᵇ is provided with a forwardly extending vertical flange 27 having vertically spaced openings 17ᵇ, and the member 18ᵇ is formed with differently spaced openings 20ᵇ. A spring-projected pin 21ᵇ is provided to pass through the openings 17ᵇ—20ᵇ which may be brought into alinement, and a vertically movable slide 22ᵇ is provided to carry said pin, angular flanges 23ᵇ being provided on the outer side of the flange 27, to guide said slide.

In the form of construction shown in Figs. 11, 12 and 13, the trough-engaging member 18ᶜ has a sleeve 28 formed integrally with one of its sides to slidably receive the stationary member 15ᶜ, said sleeve and member having differently spaced openings 17ᶜ and 20ᶜ respectively, any opening of the sleeve being capable of alinement with any opening of the member 15ᶜ, according to the vertical adjustment of the member 18ᶜ. A pin 21ᶜ is provided to pass through the alined openings, a slide 22ᶜ is provided to carry this pin, and angular flanges 23ᶜ on the outer side of the sleeve 28 are provided to guide said slide.

Attention is directed to the fact that in any form of the invention, the relatively stationary and movable sections of the support are formed with differently spaced openings, any two of which may be brought into alinement with each other, and a slidably mounted pin is provided to pass through the alined openings, said pin being carried by one section of the support so that it may readily be slid vertically to the desired position for passage through the alined openings. I am aware that it is not new to have openings spaced apart different distances in the relatively fixed and movable sections of an eaves trough support, but heretofore, it has been customary to pass an ordinary bolt through the alined openings.

With my invention however, the pin which is used instead of the bolt, forms a permanent part of the support and is always in readiness for use.

I claim:—

1. An eaves trough support comprising a stationary section to be secured to the roof, a trough-engaging section having a slidable connection with said stationary section, the two sections having differently spaced openings, any two of which may be alined, a spring projected pin for passage through the alined openings, a slide carrying said pin, and means slidably connecting said slide with one of said sections to permit vertical adjustment of the pin into alinement with the openings through which it is to be passed.

2. An eaves trough support comprising a vertically disposed bar having angular flanges whose free edge portions are spaced forwardly from the body portion of said bar, said body portion being formed with vertically spaced openings, an eaves-trough-engaging member having a plate at its inner end slidably received between said edge portions of said flanges and said body portion of said bar, said plate having openings spaced differently from the first named openings so that any opening of one series may be alined with any opening of the other series, a pin for passage through the alined openings, a slide carrying said pin, and vertically disposed angular flanges on one side of said trough-engaging member for slidably mounting said slide.

3. An eaves trough support comprising a stationary vertical bar for attachment to the roof, said bar having vertically spaced openings, an eaves-trough-engaging member having a vertical sleeve at one side to slidably receive said bar, the outer side of said sleeve having openings spaced differently from the openings of said bar, so that any opening of one series may be alined with any opening of the other series, a pin for passage through the alined openings, a slide carrying said pin, and angular guide flanges for the slide carried by the outer side of said sleeve.

In testimony whereof I have hereunto affixed my signature.

CHARLES P. MULLEN.